(12) United States Patent
Smith et al.

(10) Patent No.: US 9,127,610 B2
(45) Date of Patent: Sep. 8, 2015

(54) METHOD OF CONTROLLING A VEHICLE ENGINE SYSTEM

(75) Inventors: Kenneth L. Smith, Rainham (GB); Richard A. Judge, Gillingham (GB)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 1129 days.

(21) Appl. No.: 13/132,089

(22) PCT Filed: Nov. 26, 2009

(86) PCT No.: PCT/EP2009/065928
§ 371 (c)(1),
(2), (4) Date: Jun. 24, 2011

(87) PCT Pub. No.: WO2010/063642
PCT Pub. Date: Jun. 10, 2010

(65) Prior Publication Data
US 2011/0246047 A1    Oct. 6, 2011

(30) Foreign Application Priority Data
Dec. 5, 2008 (EP) ..................... 08170803

(51) Int. Cl.
*G06F 7/00* (2006.01)
*G06F 17/00* (2006.01)
(Continued)

(52) U.S. Cl.
CPC .............. *F02D 41/22* (2013.01); *F02D 41/28* (2013.01); *H04L 63/0428* (2013.01); *F02D 2041/227* (2013.01); *F02D 2041/285* (2013.01); *F02D 2200/0602* (2013.01); *Y02T 10/40* (2013.01)

(58) Field of Classification Search
CPC .......... H04L 9/00; G06F 21/00; F02D 41/22; F02D 2041/223
USPC ................. 123/495, 447, 456; 713/176, 189; 701/101–104; 702/138
See application file for complete search history.

(56) References Cited

U.S. PATENT DOCUMENTS 6,144,927 A * 11/2000 Grill et al. ..................... 702/142
6,360,152 B1    3/2002 Ishibashi et al.
(Continued)

FOREIGN PATENT DOCUMENTS

DE    19728841    2/1999
DE    10237698    2/2004
(Continued)

OTHER PUBLICATIONS

English Translation of Japan Office Action dated Oct. 1, 2013.
Cooke L: "Sensor Technology and Signal Analysis: High Security Encryption Supervision", 19901010-19901012, Oct. 10, 1990, pp. 29-32, XP010079311.
Letter regarding Japan Office Action dated Nov. 27, 2012.

*Primary Examiner* — Mahmoud Gimie
*Assistant Examiner* — David Hamaoui
(74) *Attorney, Agent, or Firm* — Markas Svobeda

(57) ABSTRACT

A method of controlling a vehicle engine system is described. The method involves sensing a pressure in the engine; generating a signal indicative of the sensed pressure; encrypting the signal to generate an encrypted data message containing information indicative of the sensed pressure; transmitting the encrypted data message to an engine control means; decrypting the encrypted data message to obtain the information indicative of the sensed pressure; and controlling the vehicle engine system in dependence upon the information contained in the encrypted data message. A pressure sensor for use in the method, and a suitably programmed electronic control unit are also described.

6 Claims, 2 Drawing Sheets

(51) Int. Cl.
*G01L 15/00* (2006.01)
*F02D 41/22* (2006.01)
*F02D 41/28* (2006.01)
*H04L 29/06* (2006.01)

(56) References Cited

U.S. PATENT DOCUMENTS

| | | |
|---|---|---|
| 7,402,920 B2 | 7/2008 | Kamiya |
| 7,411,481 B2 | 8/2008 | Yamamoto |
| 7,835,852 B2 | 11/2010 | Williams et al. |
| 8,166,303 B2 * | 4/2012 | Fischer et al. ............... 713/176 |
| 8,725,312 B2 * | 5/2014 | Mori et al. ..................... 701/1 |

2003/0194088 A1    10/2003    Fischer et al.

FOREIGN PATENT DOCUMENTS

| | | |
|---|---|---|
| DE | 102005039760 | 3/2007 |
| JP | 11-507151 | 6/1999 |
| JP | 2000-284808 A | 10/2000 |
| JP | 2003-115948 A | 4/2003 |
| JP | 2005-88872 A | 4/2005 |
| JP | 2005-303449 A | 10/2005 |
| JP | 2005-319870 A | 11/2005 |
| JP | 2007-008387 A | 1/2007 |
| JP | 2007-56775 | 3/2007 |
| JP | 2008-031989 A | 2/2008 |

* cited by examiner

METHOD OF CONTROLLING A VEHICLE ENGINE SYSTEM

CROSS-REFERENCE TO RELATED APPLICATION

This application claims the benefit under 35 U.S.C. §371 of published PCT Patent Publication Number PCT/EP2009/065928, filed Nov. 26, 2009, the entire disclosure of which is hereby incorporated herein by reference.

TECHNICAL FIELD

The present invention relates to a method of controlling a vehicle engine system that prevents the power output of the vehicle engine from being modified without authorisation. The invention also relates to a pressure sensor and an electronic control unit for use in said method.

BACKGROUND

It is known for vehicle owners to modify the engine control system of their vehicles in order to increase the maximum output power of the engine. One method of increasing the maximum output power at a specific engine speed of a common rail equipped diesel engine involves modifying the engine control system so that a false reduced rail pressure value is provided to the electronic control unit (ECU) of the engine. The modification causes a closed loop control strategy of the ECU to increase the fuel pressure in the common rail so that the false reduced rail pressure equals the demanded rail pressure. The result of this is that the actual pressure within the common rail is greater than the pressure reported to the ECU, which is the false reduced value. As the quantity of fuel delivered in a fixed period is a function of fuel pressure, the modification at maximum driver demand causes excess fuel to be delivered to the combustion chamber, resulting in increased engine torque and hence increased output power of the engine.

An increase in engine torque or rail pressure beyond that for which the engine is designed may cause increased engine wear and result in product failure. In turn, this may lead to warranty claims against the vehicle, engine, fuel injection system or other component manufacturers. It is therefore an aim of the present invention to provide an improved method of controlling a vehicle engine system to prevent unauthorised modification of engine power.

SUMMARY OF THE INVENTION

According to a first aspect of the present invention, there is provided a method of controlling a vehicle engine system, the method comprising: sensing a pressure in the engine; generating a signal indicative of the sensed pressure; encrypting the signal to generate an encrypted data message containing information indicative of the sensed pressure; transmitting the encrypted data message to an engine control means; decrypting the encrypted data message to obtain the information indicative of the sensed pressure; and controlling the vehicle engine system in dependence upon the information contained in the encrypted data message.

The method may comprise transmitting a non-encrypted signal to the engine control means in parallel with the encrypted data message, the non-encrypted signal also containing information indicative of the sensed pressure; comparing the information contained in the non-encrypted signal with the information contained in the encrypted data message; and controlling the vehicle engine system on the basis of the non-encrypted signal if the information contained in the non-encrypted signal is substantially the same as the information contained in the encrypted signal.

The method may comprise comparing the information contained in the non-encrypted signal with the information contained in the encrypted signal at predetermined time intervals.

The method may comprise entering a recovery mode in the event that the information contained in the non-encrypted signal is not substantially the same as the information contained in the encrypted data message.

The step of sensing a pressure in the engine may comprise sensing a fuel pressure in the engine. The step of sensing the fuel pressure in the engine may comprise sensing a fuel pressure in a common rail of a diesel engine.

According to a second aspect of the present invention, there is provided a pressure sensor comprising: pressure sensing means arranged to sense a pressure in a vehicle engine and generate an output signal indicative of the pressure; encryption means arranged to receive the output signal from the pressure sensing means and generate an encrypted data message containing information indicative of the pressure; and transmission means arranged to transmit the encrypted data message to an electronic control unit for use in a vehicle engine control strategy.

The pressure sensor may be configured to receive an encryption key from the electronic control unit and encrypt the signal in accordance with said encryption key.

The transmission means may be arranged to transmit a non-encrypted signal to the electronic control unit in parallel with the encrypted data message, the non-encrypted signal also containing information indicative of the pressure.

The encryption means may be provided within a pressure sensor housing.

According to a third aspect of the present invention, there is provided an electronic control unit for a vehicle engine, the electronic control unit comprising: first receiving means arranged to receive an encrypted data message from a pressure sensor, the encrypted data message containing information indicative of a pressure in the engine; decryption means arranged to decrypt the encrypted data message in order to obtain said information indicative of the pressure; and control means arranged to control a vehicle engine in accordance with the information contained in the encrypted data message.

The electronic control unit may be arranged to generate and transmit a Key to the pressure sensor for use by the pressure sensor in generating the encrypting the data message.

The electronic control unit may comprise second receiving means arranged to receive a non-encrypted signal from the pressure sensor, the non-encrypted signal containing information indicative of the pressure in the engine; comparison means arranged to compare the information contained in the non-encrypted signal with the information contained in the encrypted signal; wherein the control means is configured to control the vehicle engine on the basis of the non-encrypted signal if the information contained in the non-encrypted signal is substantially the same as the information contained in the encrypted signal.

The comparison means may be arranged to periodically compare the information contained in the non-encrypted signal with the information contained in the encrypted signal.

The control means may be configured to enter a recovery mode in the event that the information contained in the non-encrypted signal is not substantially the same as the information contained in the encrypted signal.

BRIEF DESCRIPTION OF THE DRAWINGS

In order that this invention may be more readily understood, preferred embodiments of the invention will now be described by way of example with reference to the accompanying drawings, in which.

DETAILED DESCRIPTION

Figure 1:
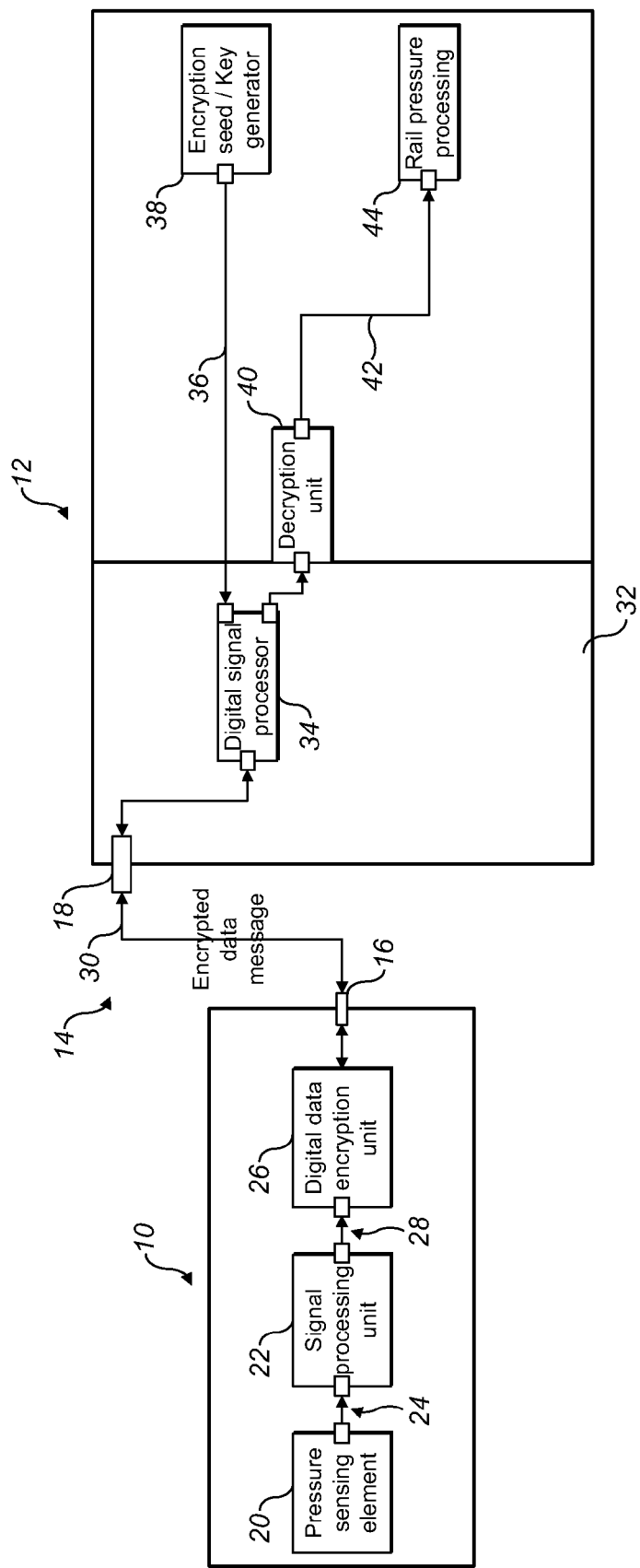
FIG. 1 is a block diagram of a first embodiment of the invention, in which a fuel pressure sensor is arranged to exchange encrypted data with a vehicle engine electronic control unit.

Referring to FIG. 1, this shows a first embodiment of the present invention, in which a fuel pressure sensor 10 is coupled to an ECU 12 by means of a bi-directional data cable 14 connected between a first input/output 16 of the pressure sensor 10 and a first input/output 18 of the ECU 12. The fuel pressure sensor 10 comprises a known pressure-sensing element 20, which in this example is configured to sense the pressure of fuel in the common rail of a fuel injection system of a diesel engine (not shown). A signal-processing unit 22 is located within the fuel pressure sensor 10 and arranged to receive and process an output signal 24 from the pressure-sensing element 20. A cryptographic process is employed whereby a digital data encryption unit 26 is provided within the pressure sensor 10 and arranged to receive the processed signal 28 from the signal-processing unit 22 and encrypt that signal using an encryption key (hereinafter referred to as the "Key") in order to generate an encrypted signal 30, which is provided to the ECU 12 via the bi-directional data cable 14.

The ECU 12 has an input/output area 32 including a digital signal processor 34 arranged to receive an encrypted signal 30 from the pressure sensor 10. The digital signal processor 34 is also arranged to receive the Key 36 from an Encryption Key Generator module 38 within the ECU 12. The digital signal processor 34 is further configured to communicate the Key 36 to a decryption module 40 within the ECU 12, and to the encryption unit 26 of the pressure sensor 10 via the bi-directional data cable 14. The decryption module 40 is arranged to decrypt the encrypted signal 30 using the Key 36 and output a decrypted signal 42. A rail pressure processing module 44 within the ECU 12 is arranged to receive the decrypted signal 42 from the decryption module 40 and determine the sensed fuel pressure in the engine from the decrypted signal 42. The rail pressure processing module 44 is further arranged to control the fuel pressure in the common rail using the fuel pressure values obtained from the decrypted signal 42.

When a fuel injection system (including the pressure sensor 10 described above) is initially associated with the ECU 12, for example during vehicle or engine assembly, a learning mode is activated. Whilst in the learning mode, the Encryption Key Generator module 38 of the ECU 12 generates a Key 36, which is stored on a memory device (not shown) of the ECU 12. The Key 36 is broadcast to the pressure sensor 10 via the bi-directional data cable 14 and is stored by the pressure sensor 10 in a memory device (not shown). The stored Key 36 is used by the encryption unit 26 of the pressure sensor 10 as an element of the encryption process, as described in more detail later.

At engine start, an exchange occurs between the ECU 12 and the pressure sensor 10 in order to verify that the correct learnt components are present. The exchange involves the ECU 12 sending a randomly generated data message to the pressure sensor 10, and the pressure sensor 10 generating a response data message using the previously learnt Key 36. The pressure sensor 10 transmits the response data message to the ECU 12 via the bi-directional data cable 14, and the ECU 12 processes the response data message using the previously stored Key 36. If the response data message matches the randomly generated data message, then the ECU 12 verifies that the Key 36 corresponds to the Key exchanged during the learning process, i.e. that the correct pressure sensor 10 is present. When the ECU 12 has verified that the correct pressure sensor 10 is present, the system commences exchanging encrypted rail pressure data. In the event that the ECU 12 determines that the response is incorrect, a recovery strategy will be entered. The recovery strategy may prevent engine starting or activate an alternative operating mode, such as an engine speed control mode in which the engine speed is a function of the driver pedal position or fixed at a predetermined value.

The encryption process may use either a single encryption Key process to ensure that the data transfer is secure or may use a dual key process such as that described below.

The rail pressure data is encrypted using the Key 36 (i.e. the learnt Key) and a second encryption key, which is hereinafter referred to as a "Period Specific Key". The Period Specific Key is also generated by the Encryption Key generator 38 of the ECU 12 and provided to the pressure sensor 10. The function of the Period Specific Key is to alter the encryption algorithm during engine running thus enabling the system to detect unauthorised inference with the system components during engine running. The Period Specific Key is periodically updated, i.e. a new Period Specific Key is generated and exchanged with the pressure sensor 10 at a frequency determined by a system calibration device (not shown). For example, the Period Specific Key may be fixed for a complete engine-running period, or updated one or more times during that period.

The data message provided to the ECU 12 from the pressure sensor 10 comprises the encrypted rail pressure data. During normal running, the decryption unit 40 of the ECU 12 decrypts the encrypted data message 30 and provides the decrypted data message 42 to the rail pressure processing module 44. The value of the decrypted data message 42 is used as the measured rail pressure. In the event of the system determining that the received rail pressure message is incorrect, the system will enter a recovery mode.

By way of example, a recovery mode may involve the ECU 12 activating an engine speed control mode, as described earlier.

Figure 2:
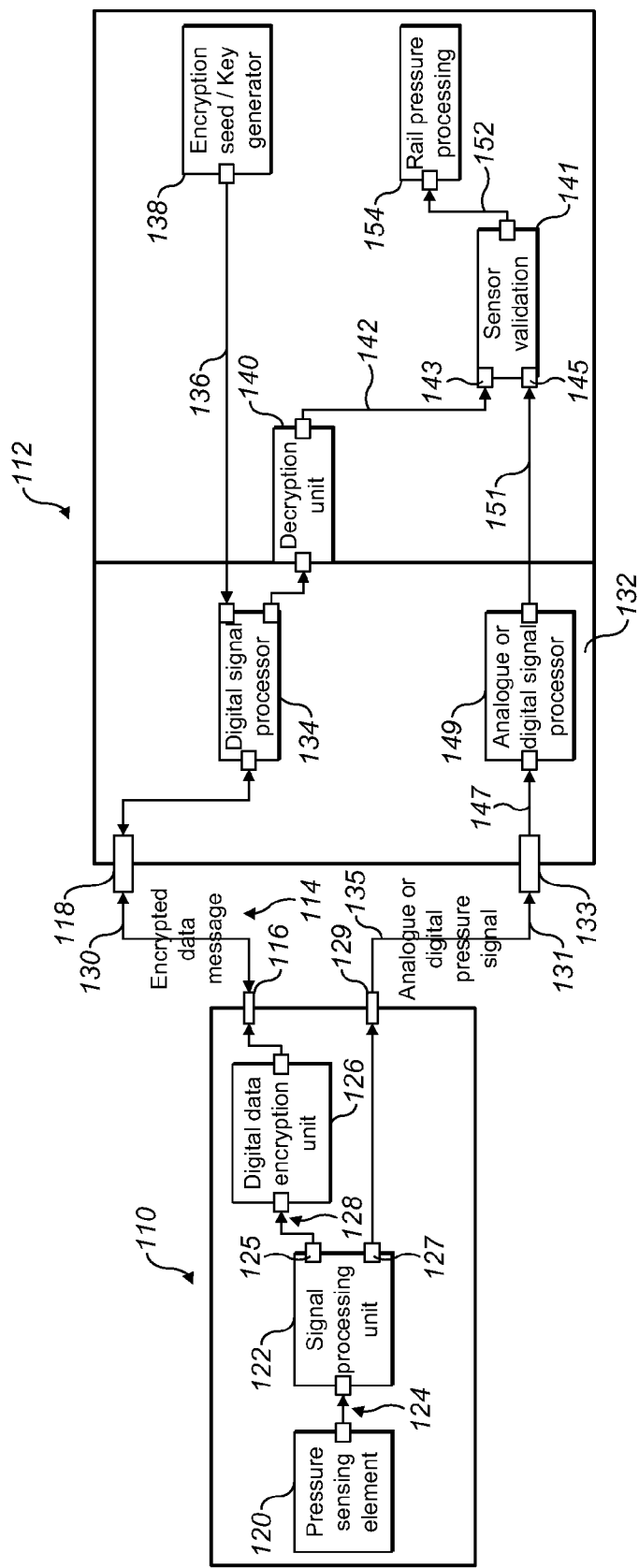
FIG. 2 is a block diagram of a second embodiment of the invention, in which a fuel pressure sensor is arranged to exchange encrypted data with a vehicle engine electronic control unit and provide non-encrypted data to the electronic control unit.

Referring now to FIG. 2, this shows a second embodiment of the invention, in which a pressure sensor 110 is arranged to provide non-encrypted data to an ECU 112 in addition to encrypted data. In common with the first embodiment described above, the pressure sensor 110 of the second embodiment comprises a known pressure sensing element 120 configured to sense the pressure of fuel in the common rail of a fuel injection system of a diesel engine. A signal processed unit 122 is located within the fuel pressure sensor 110 and arranged to receive and process an output signal 124 from the pressure sensing element 120.

A first output 125 of the signal processing unit 122 is connected to an input 127 of a digital data encryption unit 126 within the pressure sensor 110. The digital data encryption unit 126 is arranged to receive a processed signal 128 from the first output 125 of the signal processing unit 122, and encrypt that signal thereby to generate an encrypted signal 130. The encrypted signal 130 is providing to the ECU 112 via a first data cable 114, capable of bi-directional data transfer, and connected between a first input/output 116 of the pressure sensor 110 and a first input/output 118 of the ECU 112. The signal processing unit 122 also has a second output 127 which is connected directly to a second output 129 of the pressure sensor 110, thereby bypassing the digital data encryption unit 126. A second data cable 131 connects the second output 129 of the pressure sensor 110 to a second input 133 of the ECU 112, in order to convey non-encrypted data 135 from the pressure sensor 110 to the ECU 112. The non-encrypted data 135 may be analogue or digital data depending on the nature of the signal processing unit 122 and/or any further signal processing elements that may be employed.

In common with the ECU 12 described above with reference to FIG. 1, the ECU 112 of FIG. 2 has an input/output area 132 including a digital signal processor 134 arranged to receive and process the encrypted data signal 130 from the first input/output 116 of the pressure sensor 110. The digital signal processor 134 is also arranged to receive an encryption key ("Key") 136 from an encryption Key Generator module 138 within the ECU 112. The digital signal processor 134 is further configured to communicate the Key 136 to a decryption module 140 within the ECU 112, and to the encryption unit 126 of the pressure sensor 110 via the first data cable 114. The decryption module 140 is arranged to decrypt the encrypted signal 130 using the Key 136.

The ECU 112 of FIG. 2 further includes a sensor validation module 141 having first and second inputs 143, 145. The first input 143 is arranged to receive decrypted data 142 from the decryption unit 140, whilst the second input 145 is arranged to receive non-encrypted analogue or digital data from the pressure sensor 110. To this end, the input/output area 132 of the ECU 112 includes an analogue or digital signal processor 149 arranged to receive a non-encrypted data signal 147 from the pressure sensor 110 via the second input 133 of the ECU 112, process the non-encrypted data signal, and transmit a processed non-encrypted data signal 151 to the second input 145 of the sensor validation module 141.

The sensor validation module 141 is configured to validate the non-encrypted data from the pressure sensor using the encrypted data 142 from the pressure sensor 110 which is decrypted by the decryption unit 140 of the ECU 112 and provided to the first input 143 of the sensor validation module 141 as aforesaid. Validating the non-encrypted data refers to the process of confirming if the non-encrypted data contained in the processed non-encrypted data signal 151 is correct, or if an unauthorised modification has been made in order to change that data.

In order to validate the non-encrypted data signal 151, the digital data encryption unit 126 may periodically broadcast the encrypted signal 130 to the ECU 112, or the ECU 112 may issue a command to the data encryption unit 126 to transmit the encrypted signal 130 to the ECU 112. The ECU 112 then compares the decrypted value 142 of the rail pressure to the non-encrypted value 151. If the two values match to within a calibratable tolerance, the ECU 112 enters a validated data mode confirming that the non-encrypted signal from the pressure sensor 110 is correct and has not been modified.

An output signal 152 containing the validated rail pressure is output to a rail pressure processing module 154 of the ECU 112 and used to control the subsequent rail pressure in accordance with the demanded engine power output.

In the event that the two values do not match, the validated data mode will not be entered and the system will enter a recovery mode. The recovery mode may involve the ECU 112 activating an engine speed control mode, in which the engine speed is a function of the driver pedal position, or fixed at a predetermined value.

Hence, in the second embodiment of the invention, the primary signal for controlling the rail pressure is the non-encrypted signal 147 from the second output 129 of the pressure sensor 110, but this signal is periodically verified using the encrypted signal 130 from the first output 116 of the pressure sensor. An advantage of this method is that the encrypted data can be broadcast at a lower rate because it is only required to periodically verify the non-encrypted signal 147. This means that the encrypted data can be broadcast on a shared data bus such as a Controller Area Network (CAN) bus (not shown) minimising the bandwidth required on that data bus for the encrypted data.

For the avoidance of doubt, the encryption process and Key exchange used in the second embodiment of the invention is the same as that described above in relation to the first embodiment of the invention.

Many modifications may be made to the examples described above without departing from the present invention. For example, instead of communicating through data cables, the pressure sensor and ECU may communicate wirelessly, e.g. via Bluetooth®, infrared, or other suitable wireless communications protocols.

The invention claimed is:

1. A method of controlling a diesel engine system of a vehicle, the method comprising:
    sensing a fuel pressure in a common rail of the engine;
    generating a signal indicative of the sensed fuel pressure;
    encrypting the signal to generate an encrypted data message signal containing information indicative of the sensed fuel pressure;
    periodically transmitting the encrypted signal to an engine control means;
    decrypting the encrypted signal to obtain the information indicative of the sensed fuel pressure;
    transmitting a non-encrypted signal to the engine control means in parallel with the encrypted signal, the non-encrypted signal also containing information indicative of the sensed fuel pressure;
    comparing the information contained in the non-encrypted signal with the information contained in the encrypted signal; at predetermined time intervals;
    controlling fuel pressure in the common rail on the basis of the non-encrypted signal in accordance with a demanded engine power output if the information contained in the non-encrypted signal is substantially the same as the information contained in the encrypted signal; and
    entering a recovery mode in the event that the information contained in the non-encrypted signal is not substantially the same as the information contained in the encrypted signal;
    wherein the recovery mode is selected from the group consisting of: a mode in which engine starting is prevented, a mode in which the engine speed is a function of the driver pedal position, and a mode in which the engine speed is fixed at a predetermined value.

2. A pressure sensor comprising:
    pressure sensing means arranged to sense a fuel pressure in a common rail of a diesel engine of a vehicle and generate an output signal indicative of the fuel pressure;
    encryption means arranged to receive the output signal from the pressure sensing means and generate an encrypted signal containing information indicative of the fuel pressure; and transmission means arranged to:
(i) transmit a non-encrypted signal to an electronic control unit in parallel with the encrypted signal, the non-encrypted signal also containing information indicative of the sensed fuel pressure; and
(ii) periodically transmit the encrypted signal to the electronic control unit for use by the electronic control unit in validating the fuel pressure information contained in the non-encrypted signal.

3. The pressure sensor of claim 2, wherein the pressure sensor is configured to receive an encryption key from the electronic control unit and encrypt the output signal in accordance with said encryption key.

4. The pressure sensor of claim 2, wherein the encryption means is provided within a pressure sensor housing.

5. An electronic control unit for a diesel engine of a vehicle, the electronic control unit comprising:
first receiving means arranged to receive an encrypted signal from a pressure sensor, the encrypted signal containing information indicative of a fuel pressure in a common rail of the engine;
second receiving means arranged to receive a non-encrypted signal from the pressure sensor, the non-encrypted signal containing information indicative of the pressure in the engine;
decryption means arranged to decrypt the encrypted signal in order to obtain the information indicative of the fuel pressure contained in said signal;
comparison means arranged to compare the information contained in the non-encrypted signal with the information contained in the encrypted signal and
control means configured to:
(i) control subsequent fuel pressure in the common rail on the basis of the non-encrypted signal in accordance with a demanded engine power output if the information contained in the non-encrypted signal is substantially the same as the information contained in the encrypted signal; and
(ii) enter a recovery mode in the event that the information contained in the non-encrypted signal is not substantially the same as the information contained in the encrypted signal;
wherein the recovery mode is selected from the group consisting of: a mode in which engine starting is prevented, a mode in which the engine speed is a function of the driver pedal position, and a mode in which the engine speed is fixed at a predetermined value.

6. The electronic control unit of claim 5, wherein the electronic control unit is arranged to generate and transmit a Key to the pressure sensor for use by the pressure sensor in generating the encrypted signal.

* * * * *